US010287813B2

United States Patent
Kolar et al.

(10) Patent No.: US 10,287,813 B2
(45) Date of Patent: May 14, 2019

(54) BUMP STOP FOR VEHICLE HOOD

(71) Applicant: FORD GLOBAL TECHNOLOGIES, LLC, Dearborn, MI (US)

(72) Inventors: Ted Victor Kolar, Dearborn, MI (US); Sushil Shastry, Brighton, MI (US); Robert Schwalm, Windsor (CA); Deepak Patel, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/651,412

(22) Filed: Jul. 17, 2017

(65) Prior Publication Data

US 2019/0017310 A1    Jan. 17, 2019

(51) Int. Cl.
| | |
|---|---|
| *B62D 25/12* | (2006.01) |
| *B60R 21/34* | (2011.01) |
| *E05F 5/02* | (2006.01) |
| *B62D 25/10* | (2006.01) |

(52) U.S. Cl.
CPC ............ *E05F 5/022* (2013.01); *B62D 25/105* (2013.01); *B62D 25/12* (2013.01); *B60R 21/34* (2013.01); *B60R 2021/343* (2013.01); *E05Y 2900/536* (2013.01)

(58) Field of Classification Search
CPC . B62D 25/12; E05F 5/022; E05F 5/06; B60R 21/38; B60R 21/34; B60R 2021/343
USPC ............................................ 296/207, 187.04
See application file for complete search history.

(56) References Cited

U.S. PATENT DOCUMENTS

| | | | |
|---|---|---|---|
| 5,482,348 A | 1/1996 | Mass et al. | |
| 6,039,388 A | 3/2000 | Choi | |
| 6,394,211 B1 * | 5/2002 | Palenchar | B62D 25/10 180/69.21 |
| 7,552,789 B2 * | 6/2009 | Gust | B60R 21/38 180/69.21 |
| 7,690,722 B2 * | 4/2010 | Boggess | B60R 21/34 296/187.04 |
| 9,381,951 B2 * | 7/2016 | Iyer | B60R 21/34 |
| 9,656,627 B2 * | 5/2017 | Gardynik | B60R 21/34 |
| 10,030,429 B2 * | 7/2018 | Liu | B60J 5/101 |
| 2004/0025290 A1 | 2/2004 | Novarino | |

(Continued)

FOREIGN PATENT DOCUMENTS

| | | |
|---|---|---|
| CN | 101574954 | 11/2009 |
| DE | 102005012773 | 9/2006 |
| DE | 602004002469 | 3/2007 |

*Primary Examiner* — Pinel E Romain
(74) *Attorney, Agent, or Firm* — Carlson, Gaskey & Olds, P.C.

(57) ABSTRACT

An apparatus, according to an exemplary aspect of the present disclosure includes, among other things, a hood inner panel having a rear edge and a front edge, a latch mounted to the hood inner panel at an offset location that is spaced from the front edge, and at least one bump stop mounted to the hood inner panel between the offset location and the front edge. The bump stop includes a lock feature to prevent removal of the bump stop from the hood inner panel. A method according to an exemplary aspect of the present disclosure includes, among other things, mounting at least one resilient bump stop to the hood inner panel between the offset location and the front edge to absorb impact energy and to provide a seal force to stabilize the latch during closure.

20 Claims, 5 Drawing Sheets

(56) References Cited

U.S. PATENT DOCUMENTS

| | | | |
|---|---|---|---|
| 2014/0292030 A1* | 10/2014 | Lim | E05F 5/022 296/187.09 |
| 2015/0115625 A1* | 4/2015 | Park | E05B 83/24 292/194 |
| 2015/0167359 A1 | 6/2015 | Reyes | |
| 2015/0211265 A1* | 7/2015 | Uyanik | E05B 85/045 292/195 |
| 2016/0046259 A1* | 2/2016 | Jayasuriya | B60R 21/013 180/274 |
| 2016/0207494 A1* | 7/2016 | Hector, Jr. | B60R 21/34 |
| 2016/0305174 A1 | 10/2016 | Swann et al. | |

* cited by examiner

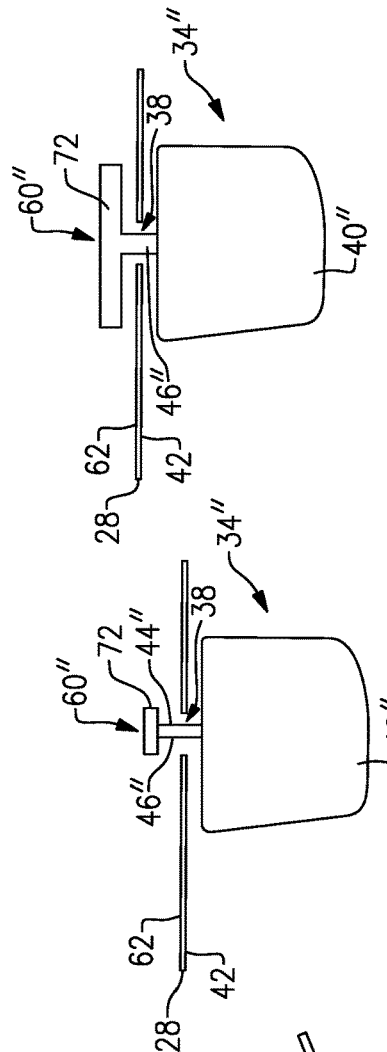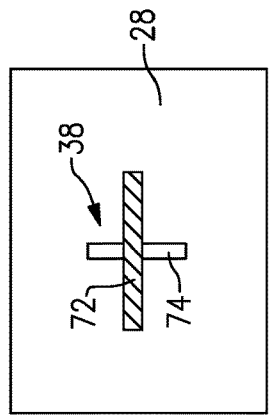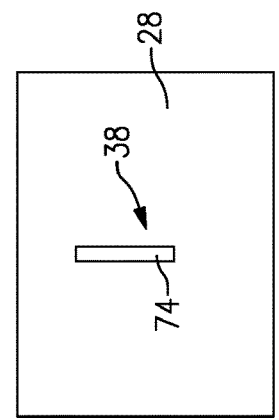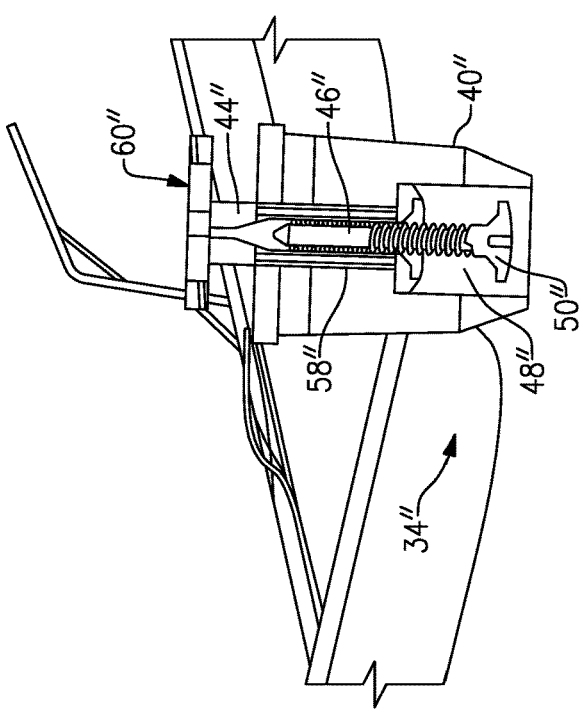

BUMP STOP FOR VEHICLE HOOD

TECHNICAL FIELD

This disclosure relates to an exemplary apparatus and method of providing a bump stop for a vehicle hood that absorbs impact energy and provides a seal force to stabilize the latch during closure of the hood inner panel.

BACKGROUND

Vehicles include hoods that have latches to secure the hood to a vehicle frame. Over-slam bumpers are typically installed between a hood inner panel and the frame to prevent the hood from impacting the fascia during closure. In one known example, a rubber bumper is attached to the hood inner panel by being pressed through an opening in the hood inner panel. These bumpers can become dislodged during opening and closing of the hood, which can lead to a slamming impact of the hood against the fascia. This type of impact often results in chipped paint which is undesirable.

SUMMARY

An apparatus according to an exemplary aspect of the present disclosure includes, among other things, a hood inner panel having a rear edge and a front edge, a latch mounted to the hood inner panel at an offset location that is spaced from the front edge, and at least one bump stop mounted to the hood inner panel between the offset location and the front edge. The bump stop includes a lock feature to prevent removal of the bump stop from the hood inner panel.

In a further non-limiting embodiment of the foregoing apparatus, the at least one bump stop comprises a plurality of bump stops.

In a further non-limiting embodiment of either of the foregoing apparatus, the latch is positioned closer to a center of the hood inner panel than to the front edge.

In a further non-limiting embodiment of any of the foregoing apparatus, the bump stop comprises a resilient member that absorbs impact energy and provides a seal force to stabilize the latch during closure of the hood inner panel.

In a further non-limiting embodiment of any of the foregoing apparatus, the bump stop comprises a resilient body portion extending outwardly from an external surface of the hood inner panel and a protruding attachment portion that extends through an opening in the hood inner panel.

In a further non-limiting embodiment of any of the foregoing apparatus, the opening comprises a slot and wherein the protruding attachment portion comprises a rotatable member that fits through the slot in an initial position and which is then rotated to a final position such that the protruding attachment portion cannot be removed from the hood inner panel via the slot.

In a further non-limiting embodiment of any of the foregoing apparatus, a rotatable member is insertable within the protruding attachment portion to move the protruding attachment portion from an initial position where the protruding attachment portion fits through the opening and a final position wherein the protruding portion is prevented from being pulled out of the opening.

In a further non-limiting embodiment of any of the foregoing apparatus, the rotatable member comprises a fastener.

In a further non-limiting embodiment of any of the foregoing apparatus, the resilient body portion includes a recess configured to receive a fastener that is rotated to a final installation position such that a head of the fastener does not protrude outwardly of the resilient body portion and such that the protruding attachment portion is prevented from being removed from the hood inner panel.

An apparatus according to another exemplary aspect of the present disclosure includes, among other things, a vehicle panel moveable relative to a vehicle structure between open and closed positions, and at least one bump stop positioned between the vehicle panel and the vehicle structure. The bump stop includes a resilient body portion to absorb impact energy, and a rotatable member extending through an opening in one of the vehicle panel and structure that is rotated to a final installation position to prevent removal of the bump stop.

In a further non-limiting embodiment of any of the foregoing apparatus, the opening is in the vehicle panel and the bump stop includes a protruding attachment portion that extends through the opening, and wherein the rotatable member comprises a fastener that moves the protruding attachment portion to the final installation position such that the protruding attachment portion cannot be pulled out of the opening.

In a further non-limiting embodiment of any of the foregoing apparatus, the protruding attachment portion includes an internal bore and extends to a tip that comprises at least two movable legs, and wherein the rotatable member is rotated into the internal bore to move the legs radially outwardly to the final installation position.

In a further non-limiting embodiment of any of the foregoing apparatus, the protruding attachment portion includes an internal bore that receives a nut, and wherein the rotatable member is rotated into the nut to deform the protruding attachment portion radially outwardly to the final installation position.

In a further non-limiting embodiment of any of the foregoing apparatus, the opening comprises a slot and wherein the rotatable member fits through the slot in an initial position and is then rotated to the final installation position such that the rotatable member cannot be removed via the slot.

In a further non-limiting embodiment of any of the foregoing apparatus, the vehicle panel comprises a hood inner panel and including a latch mounted to the hood inner panel at an offset location that is spaced from a front edge of the hood inner panel, and wherein the bump stop is mounted to the hood inner panel between the offset location and the front edge to provide a seal force to stabilize the latch during closure.

In a further non-limiting embodiment of any of the foregoing apparatus, the at least one bump stop comprises a plurality of bump stops.

A method according to another exemplary aspect of the present disclosure includes the steps of, among other things: providing a hood inner panel having a front edge that pivots relative to a rear edge between open and closed positions; mounting a latch to the hood inner panel at an offset location that is spaced from the front edge; and mounting at least one resilient bump stop to the hood inner panel between the offset location and the front edge to absorb impact energy and to provide a seal force to stabilize the latch during closure.

In a further non-limiting embodiment of the foregoing method, the method includes forming the bump stop to have a resilient body portion extending outwardly from an external surface of the hood inner panel and to have a protruding attachment portion that extends through an opening in the hood inner panel.

In a further non-limiting embodiment of either of the foregoing methods, the opening comprises a slot and wherein the protruding attachment portion comprises a rotatable member, and including fitting the rotatable member through the slot in an initial position and then rotating the rotatable member to a final position such that the protruding attachment portion cannot be removed from the hood inner panel via the slot.

In a further non-limiting embodiment of any of the foregoing methods, the method includes rotating a rotatable member into the protruding attachment portion to move the protruding attachment portion from an initial position where the protruding attachment portion fits through the opening and a final position wherein the protruding portion is prevented from being pulled out of the opening.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 5A is another example of a bump stop in an initial installation position.

FIG. 5B is the bump stop of FIG. 5A in a final installation position.

FIG. 5C shows a section view of FIG. 5A.

FIG. 6A shows an opening for the bump stop of FIG. 5A.

FIG. 6B shows the bump stop of FIG. 5A in the final installation position.

DETAILED DESCRIPTION

This disclosure details exemplary apparatus and methods of providing a bump stop for a vehicle hood that absorbs impact energy and provides a seal force to stabilize the latch during closure of the hood inner panel.

Figure 1:
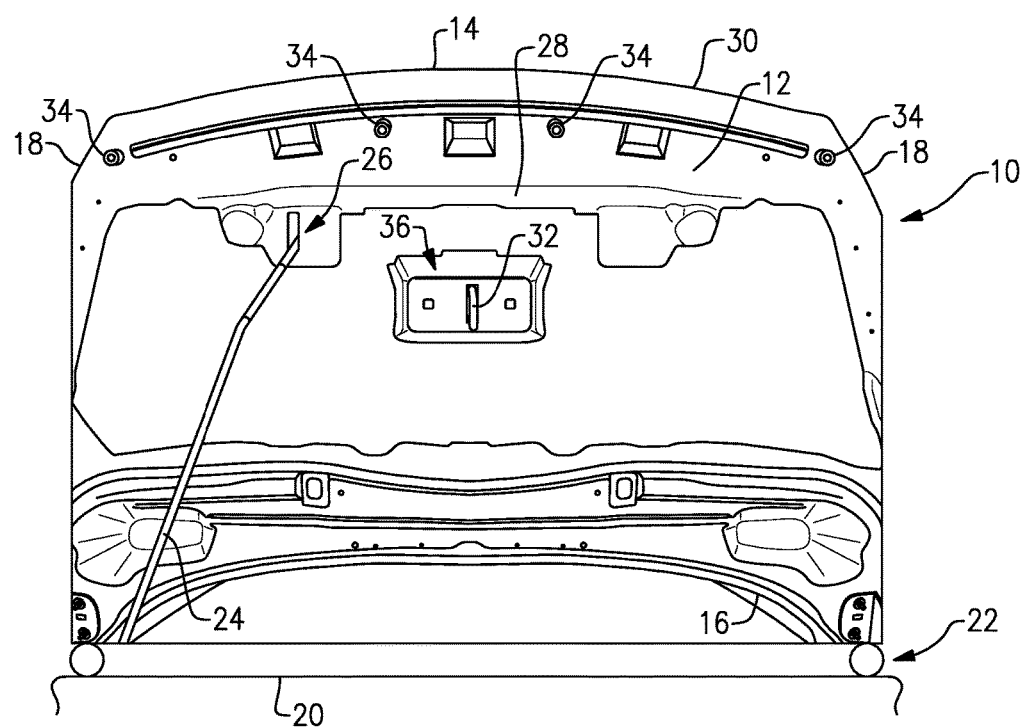
FIG. 1 illustrates a vehicle hood in a raised position with an offset latch.

A vehicle 10 includes a hood 12 having a front edge 14, a rear edge, 16, and a pair of side edges 18. In one example, the hood 12 is pivotally connected to a vehicle frame 20 as schematically indicated at 22. The hood 12 pivots between an open position as shown in FIG. 1 and a closed position where the hood 12 is flush with surrounding vehicle body panels. An arm 24 can be raised to support the hood 12 in the raised or open position as indicated at 26.

The hood 12 includes a hood inner panel 28 that faces an engine compartment and an outer panel 30 that forms an exterior hood surface of the vehicle 10. A latch 32 is used to secure the hood 12 to the frame 20. One or more bump stops 34 are positioned between the hood inner panel 28 and the frame 20 to absorb impact energy during closure of the hood 12.

In some countries, vehicles are designed to minimize, as much as possible, impact injuries to pedestrians. For example, there is a European Pedestrian Protection rating that is given to vehicles based on such impact effects. The hood 12 is a component that has potential for impact with a pedestrian. In order to minimize this impact effect, the latch 32 is moved from a traditional location at the front edge 14 of the hood 12 to an offset location 36 from the front edge 14. In one example, the latch 32 is positioned closer to a center of the hood 12 than to the front edge 14. This mounting configuration provides greater flexibility at the front portion of the hood 12 which allows the hood 12 to absorb more impact energy instead of passing this energy to a pedestrian.

However, having the latch 32 at this offset location 36 reduces the seal load at the latch 32, which can adversely affect stability of the latch 32. The bump stops 34 are thus positioned between the front edge 14 of the hood and the offset location 36 of the latch 32 to absorb impact energy and to provide a sufficient seal force to stabilize the latch during closure of the hood 12. In one example, four bump stops 34 are provided, with one bump stop 34 being positioned at each transition corner between the front edge 14 and side edges 18, and two bump stops 34 being located in a middle area along the front edge 14.

Figure 2:
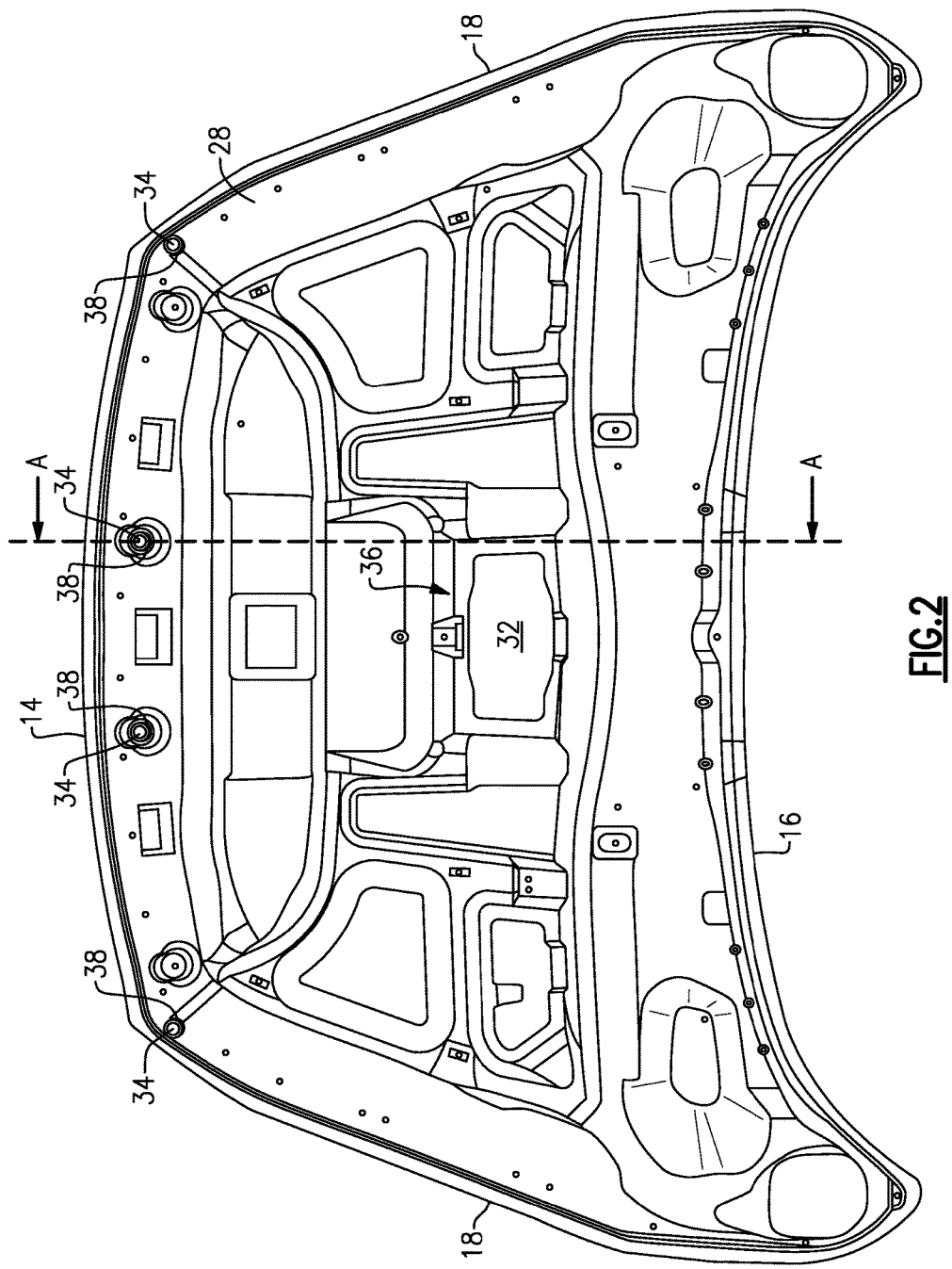
FIG. 2 illustrates a hood inner panel from the hood in FIG. 1, the hood inner panel including bump stops incorporating the subject invention.

In one example, the bump stops 34 are secured to the hood inner panel 28 as shown in FIG. 2. However, the bumps stops 34 could also, optionally or additionally, be attached to the frame 20. In order to make sure that the bump stops 34 are securely held in place during opening and closing of the hood, each bump stop 34 includes a lock feature that comprises a rotatable member that extends through an opening 38 in the hood inner panel 28 and that is rotated to a final installation position to prevent removal of the bump stop 34 from the hood 12.

Figure 3A:
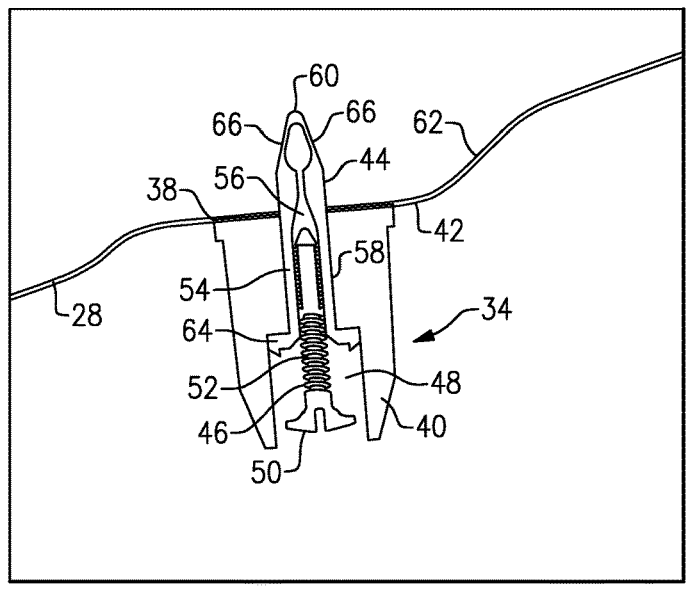
FIG. 3A is one example of a known bump stop in an initial installation position.
Figure 3B:
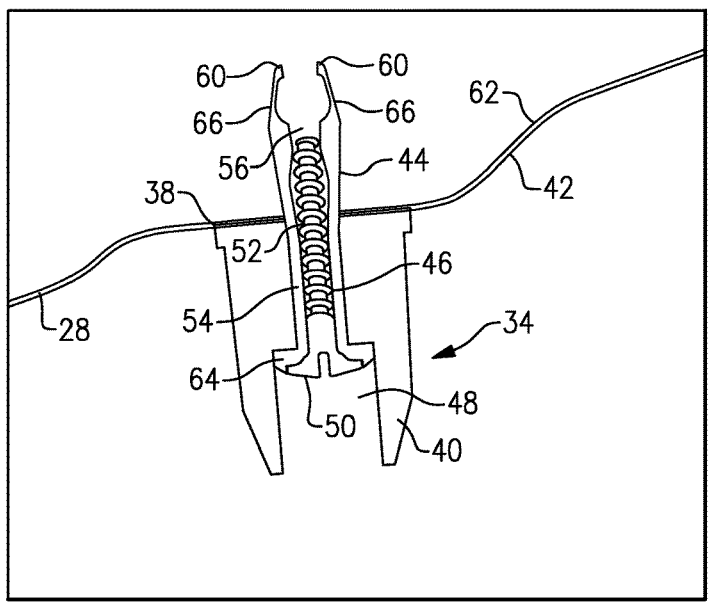
FIG. 3B is the bump stop of FIG. 3A in a final installation position.

FIGS. 3A-3B show one known example of a scrivet configuration for a bump stop 34. In this example, the bump stop 34 includes a resilient body portion 40 extending outwardly from an external surface 42 of the hood inner panel 28 and a protruding attachment portion 44 that extends through the opening 38 in the hood inner panel 28. The resilient body portion 40 absorbs impact energy during closure of the hood 12, and the protruding attachment portion 44 provides a lock feature to secure the bump stop 34 in place. A rotatable member 46 is inserted within the protruding attachment portion 44 to move the protruding attachment portion 44 from an initial installation position (FIG. 3A) where the protruding attachment portion 44 fits through the opening 38 to a locked and final installation position (FIG. 3B) where the protruding attachment portion 44 is prevented from being pulled out of the opening 38.

The resilient body portion 40 is configured to absorb impact forces and includes a recess 48 configured to receive the rotatable member 46. In one example, the rotatable member 46 comprises a fastener, such as a screw for example, that includes a head 50 and a threaded body portion 52. In this example, the protruding attachment portion 44 comprises an elongated body 54 with an internal bore 56. The elongated body 54 is inserted through a passage 58 in the resilient body portion 40 and extends to a tip 60 that extends outwardly of the resilient body portion 40 and beyond an internal surface 62 of the hood inner panel 28. The elongated body 54 also includes a head 64 that is seated within the recess 48. The passage 58 has a smaller cross-section than the recess 48 such that the head 64 provides a stop against a bottom surface of the recess 48 to securely hold the elongated body 54 in place.

The tip 60 of the elongated body 54 comprises at least two movable legs 66. To move the protruding attachment portion 44 to the final installation position, the rotatable member 46 is rotated into the internal bore 56 of the elongated body 54 to move the legs 66 radially outwardly to the final installation position as shown in FIG. 3B. This flared tip configuration results in the legs 66 bearing against the internal surface 62 of the hood inner panel 28 such that the bump stop 34 is prevented from being pulled out of the opening 38. Further, when the rotatable member 46 is rotated to the final installation position both the head 64 of the elongated body 54 and the head 50 of the rotatable member 46 are positioned within the recess 48 such that the heads 50, 64 do not protrude outwardly from the resilient body member 40.

Figure 4A:
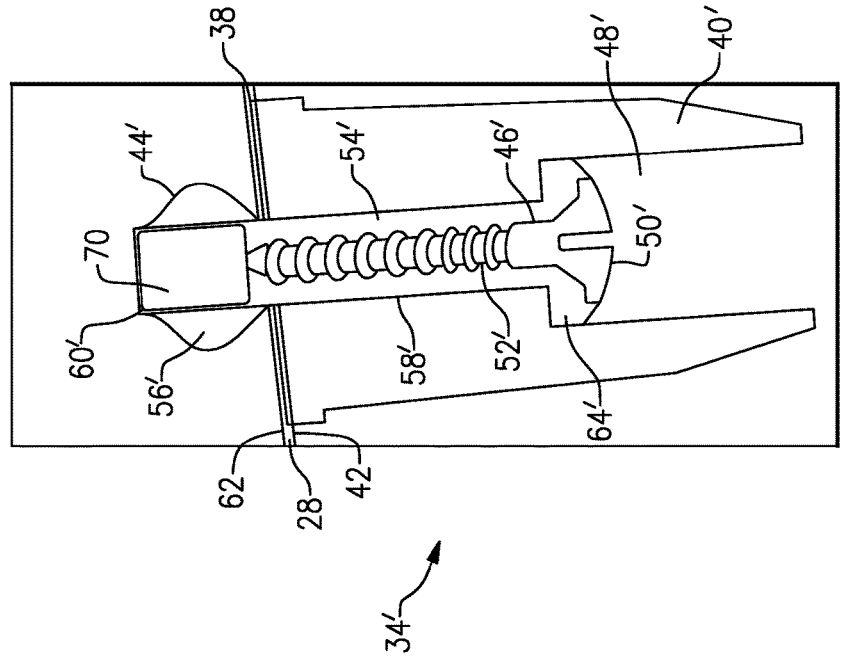
FIG. 4A is an example of a bump stop incorporating the subject invention, where the bump stop is in an initial installation position.
Figure 4B:
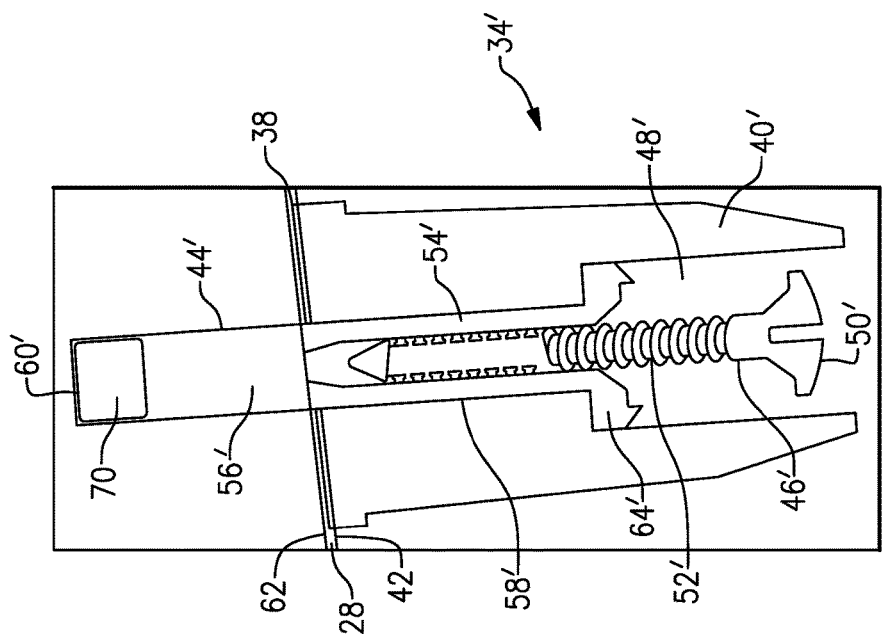
FIG. 4B is the bump stop of FIG. 4A in a final installation position.

FIGS. 4A-4B show an attachment example for a bump stop 34' incorporating the subject invention. In this example, the bump stop 34' includes a resilient body portion 40' extending outwardly from the external surface 42 of the hood inner panel 28 and a protruding attachment portion 44' that extends through the opening 38 in the hood inner panel 28. A rotatable member 46' is inserted within the protruding attachment portion 44' to move the protruding attachment portion 44' from an initial installation position (FIG. 4A) where the protruding attachment portion 44' fits through the opening 38 to a locked and final installation position (FIG. 4B) where the protruding attachment portion 44' is prevented from being pulled out of the opening 38.

The resilient body portion 40' includes a recess 48' configured to receive the rotatable member 46'. In one example, the rotatable member 46' comprises a fastener, such as a screw for example, which includes a head 50' and a threaded body portion 52'. In this example, the protruding attachment portion 44' comprises an elongated body 54' with an internal bore 56'. The elongated body 54' is inserted through a passage 58' in the resilient body portion 40' and extends to an enclosed distal end 60' that extends outwardly of the resilient body portion 40' and beyond the internal surface 62 of the hood inner panel 28. The elongated body 54' also includes a head 64' that is seated within the recess 48'. The passage 58' has a smaller cross-section than the recess 48' such that the head 64' provides a stop against a bottom surface of the recess 48' to securely hold the elongated body 54' in place.

A nut 70 is positioned within the internal bore 56' of the elongated body 54' and is fixed to the enclosed distal end 60'. To move the protruding attachment portion 44' to the final installation position, the rotatable member 46' is rotated into the internal bore 56' of the elongated body 54' to threadably engage the nut 70. In this example, the elongated body portion 54' is made from a deformable or resilient material. As the rotatable member 46' tightens into the nut 70, the elongated body 54' deforms or collapses in a radially outward direction which moves the protruding attachment portion 44' to the final installation position as shown in FIG. 4B. This collapsed body configuration results in the collapsed material of the elongated body portion 54' being compressed against the internal surface 62 of the hood inner panel 28 such that the bump stop 34' is prevented from being pulled out of the opening 38. Further, when the rotatable member 46' is rotated to the final installation position both the head 64' of the elongated body 54' and the head 50' of the rotatable member 46' are positioned within the recess 48' such that the heads 50', 64' do not protrude outwardly from the resilient body member 40'.

FIGS. 5A-6B show another attachment example for a bump stop 34". In this example, the bump stop 34" includes a resilient body portion 40" extending outwardly from the external surface 42 of the hood inner panel 28 and a protruding attachment portion 44" that extends through the opening 38 in the hood inner panel 28. In this example, the protruding attachment portion 44" comprises a rotatable member 46" that is inserted through the opening 38 in the hood inner panel 28 and is rotated from an initial installation position (FIG. 5A) where the rotatable member 46" fits through the opening 38 and a final installation position (FIG. 5B) where the rotatable member 46" is prevented from being pulled out of the opening 38.

The resilient body portion 40" includes a recess 48" (FIG. 5C) configured to receive the rotatable member 46". The rotatable member 46" can comprise a fastener that includes a head 50" and a body portion 52" that is inserted through a passage 58" in the resilient body portion 40" and extends to a distal end 60" that extends outwardly of the resilient body portion 40" and beyond the internal surface 62 of the hood inner panel 28. The head 50" is seated within the recess 48". The passage 58" has a smaller cross-section than the recess 48" such that the head 50" provides a stop against a bottom surface of the recess 48" to securely hold the rotatable member 46" in place in an axial direction.

The distal end 60" of the rotatable member 46" includes an elongated tab 72 that is orientated perpendicularly to the end 60" of the rotatable member 46" to form a T-shape. To move the rotatable member 46" to the final installation position, the rotatable member 46' is rotated ninety degrees such that the tab 72 moves from an initial installation position where the tab 72 fits through the opening 38 (FIGS. 5A and 6A) to the final installation position where the tab 72 cannot be pulled through the opening (FIGS. 5B and 6B).

In this configuration, the opening 38 comprises a slit or slot 74 that has a width that is narrower than a length of the slot 74. The tab 72 has a similar shape such that the tab 72 can be inserted through the slot 74 in the initial installation position; however, once the tab 72 is rotated by ninety degrees to the final installation position, the tab 72 cannot be pulled through the slot 74. This configuration results in the tab 72 bearing against the internal surface 62 of the hood inner panel 28 such that the bump stop 34" is prevented from being pulled out of the opening 38. Further, when the rotatable member 46" is rotated to the final installation position the head 50" of the rotatable member 46' is positioned within the recess 48" such that the head 50" does not protrude outwardly from the resilient body member 40".

In one example, the bump stops 34 of the various embodiments are made from a resilient material such as rubber, for example. The bump stops 34 can be made by rubber injection molding or other similar processes.

The subject invention provides one or more bump stops 34 that prevent the hood 12 from impacting surrounding components such as light housing modules, fascia components, etc. Further, the bump stops 34 are configured to provide a sufficient seal force for the latch 32 to prevent hood movement and for improved latch durability. Further, the bump stops stabilize the hood 12 while also providing improved pedestrian protection. The bump stops 34 also include a lock feature such that the stops are tightly secured to the hood inner panel 28 with a rotatable member such that the bump stops 34 cannot be easily dislodged during opening and closing of the hood. Further, inadvertent side swipe forces, such as when someone swipes their hand under the front edge of the hood 12 in search of the latch 32, cannot dislodge the bump stops due to their robust and locked connection interface to the hood inner panel.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An apparatus, comprising:
a hood having a front edge;
a latch mounted to the hood inner panel at an offset location that is spaced from the front edge; and
at least one bump stop mounted to the hood between the offset location and the front edge, the bump stop including a protruding attachment portion with a enclosed distal end and a lock feature to prevent removal of the bump stop from the hood.

2. The apparatus of claim 1, wherein the at least one bump stop comprises a plurality of bump stops.

3. The apparatus of claim 1, wherein the latch is positioned closer to a center of the hood than to the front edge.

4. The apparatus of claim 1, wherein the bump stop comprises a resilient member that absorbs impact energy and provides a seal force to stabilize the latch during closure of the hood.

5. The apparatus of claim 1, wherein the hood includes a hood inner panel and the bump stop comprises a resilient body portion extending outwardly from an external surface of the hood inner panel and the protruding attachment portion extends through an opening in the hood inner panel.

6. The apparatus of claim 5, wherein the opening comprises a slot and wherein the protruding attachment portion comprises a rotatable member that fits through the slot in an initial position and which is then rotated to a final position such that the protruding attachment portion cannot be removed from the hood inner panel via the slot.

7. The apparatus of claim 5, including a rotatable member that is insertable within the protruding attachment portion to move the protruding attachment portion from an initial position where the protruding attachment portion fits through the opening and a final position wherein the protruding portion is prevented from being pulled out of the opening.

8. The apparatus of claim 7, wherein the rotatable member comprises a fastener.

9. The apparatus of claim 5, wherein the resilient body portion includes a recess configured to receive a fastener that is rotated to a final installation position such that a head of the fastener does not protrude outwardly of the resilient body portion and such that the protruding attachment portion is prevented from being removed from the hood inner panel.

10. An apparatus, comprising:
a vehicle panel moveable relative to a vehicle structure between open and closed positions; and
at least one bump stop positioned between the vehicle panel and the vehicle structure, the bump stop including
a resilient body portion to absorb impact energy, and
a protruding attachment portion with an enclosed distal end extending through an opening in one of the vehicle panel and structure, and movable to a final installation position to prevent removal of the bump stop.

11. The apparatus of claim 10, wherein the opening is in the vehicle panel and the protruding attachment portion includes a nut that is fixed within the enclosed distal end, and including a fastener that engages the nut and moves the protruding attachment portion to the final installation position such that the protruding attachment portion cannot be pulled out of the opening.

12. The apparatus of claim 11, wherein the protruding attachment portion includes an internal bore that receives the nut, and wherein the rotatable member is rotated into the nut to deform the protruding attachment portion radially outwardly to the final installation position.

13. The apparatus of claim 10, wherein the opening comprises a slot and wherein the enclosed distal end fits through the slot in an initial position and is then rotated to the final installation position such that the protruding attachment portion cannot be removed via the slot.

14. The apparatus of claim 10, wherein the vehicle panel comprises a hood inner panel and including a latch mounted to the hood inner panel at an offset location that is spaced from a front edge of the hood inner panel, and wherein the bump stop is mounted to the hood inner panel between the offset location and the front edge to provide a seal force to stabilize the latch during closure.

15. The apparatus of claim 10, wherein at least one bump stop comprises a plurality of bump stops.

16. A method comprising:
providing a hood inner panel having a front edge that pivots relative to a rear edge between open and closed positions, and providing at least one resilient bump stop with a protruding attachment portion having an enclosed distal end;
mounting a latch to the hood inner panel at an offset location that is spaced from the front edge; and
mounting the at least one resilient bump stop to the hood inner panel by inserting the enclosed distal end through an opening in the hood inner panel between the offset location and the front edge to absorb impact energy and to provide a seal force to stabilize the latch during closure.

17. The method according to claim 16, including forming the bump stop to have a resilient body portion extending outwardly from an external surface of the hood inner panel and wherein the protruding attachment portion extends through the opening in the hood inner panel to protrude beyond an internal surface of the hood inner panel.

18. The method according to claim 17, wherein the opening comprises a slot and wherein the protruding attachment portion comprises a rotatable member, and including fitting the rotatable member through the slot in an initial position and then rotating the rotatable member to a final position such that the protruding attachment portion cannot be removed from the hood inner panel via the slot.

19. The method according to claim 17, including rotating a rotatable member into the protruding attachment portion to move the protruding attachment portion from an initial position where the protruding attachment portion fits through the opening and a final position wherein the protruding portion is prevented from being pulled out of the opening.

20. The apparatus of claim 1, wherein:
the protruding attachment portion comprises an internal bore that receives a nut that is fixed to the enclosed distal end, and wherein a rotatable member is rotated into the nut to deform the protruding attachment portion radially outwardly to prevent removal of the bump stop, or
the enclosed distal end comprises an elongated tab that fits through a slot in an inner panel of the hood and is then rotated to a final installation position such that the elongated tab cannot be removed via the slot.

* * * * *